US009062609B2

(12) United States Patent
Mehring et al.

(10) Patent No.: US 9,062,609 B2
(45) Date of Patent: Jun. 23, 2015

(54) SYMMETRIC FUEL INJECTION FOR TURBINE COMBUSTOR

(75) Inventors: Carsten Ralf Mehring, Ladera Ranch, CA (US); James Peffley, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 786 days.

(21) Appl. No.: 13/345,825

(22) Filed: Jan. 9, 2012

(65) Prior Publication Data
US 2013/0174559 A1    Jul. 11, 2013

(51) Int. Cl.
| F23R 3/06 | (2006.01) |
| F02C 7/22 | (2006.01) |
| F23R 3/34 | (2006.01) |
| F23R 3/32 | (2006.01) |
| F23R 3/54 | (2006.01) |

(52) U.S. Cl.
CPC ... *F02C 7/22* (2013.01); *F23R 3/34* (2013.01); *F23R 3/06* (2013.01); *F23R 3/32* (2013.01); *F23R 3/54* (2013.01); *F23D 2900/11101* (2013.01); *Y02T 50/675* (2013.01)

(58) Field of Classification Search
CPC .... F02C 7/22; F23D 2900/11101; F23R 3/06; F23R 3/32; F23R 3/34; F23R 3/54
USPC ............. 60/732–733, 737, 748, 747, 804
See application file for complete search history.

(56) References Cited

U.S. PATENT DOCUMENTS

| 1,372,121 | A | * | 3/1921 | Davis | 60/39.59 |
| 2,218,281 | A | * | 10/1940 | De Ridder et al. | 60/39.55 |
| 3,518,037 | A | | 6/1970 | Sneeden | |
| 3,937,011 | A | * | 2/1976 | Caruel et al. | 60/737 |
| 3,973,390 | A | | 8/1976 | Jeroszko | |
| 4,884,746 | A | * | 12/1989 | Lewis | 239/406 |
| 4,891,936 | A | * | 1/1990 | Shekleton et al. | 60/804 |
| 5,150,570 | A | * | 9/1992 | Shekleton | 60/804 |
| 5,163,284 | A | * | 11/1992 | Shekleton | 60/804 |
| 5,297,391 | A | | 3/1994 | Roche | |
| 5,363,644 | A | * | 11/1994 | Shekleton et al. | 60/804 |
| RE34,962 | E | * | 6/1995 | Shekleton et al. | 60/804 |
| 5,515,681 | A | | 5/1996 | DeFreitas | |
| 5,546,745 | A | | 8/1996 | Kurschenreuter, Jr. | |
| 5,755,090 | A | | 5/1998 | Hu | |
| 5,966,937 | A | | 10/1999 | Graves | |
| 6,016,658 | A | * | 1/2000 | Willis et al. | 60/737 |
| 6,209,309 | B1 | | 4/2001 | McArthur | |
| 6,684,642 | B2 | * | 2/2004 | Willis et al. | 60/746 |
| 6,786,430 | B2 | * | 9/2004 | Hayashi | 239/406 |
| 6,931,862 | B2 | | 8/2005 | Harris | |
| 6,935,117 | B2 | | 8/2005 | Cowan | |
| 7,640,723 | B2 | | 1/2010 | Alexander | |
| 8,689,559 | B2 | * | 4/2014 | Kraemer et al. | 60/733 |
| 2010/0229557 | A1 | * | 9/2010 | Matsumoto et al. | 60/737 |

* cited by examiner

OTHER PUBLICATIONS

Lefebvre, Arthur H., Atomization and Sprays, 1989, Hemisphere Publishing Corporation, p. 273.*

*Primary Examiner* — Ted Kim
(74) *Attorney, Agent, or Firm* — Kinney & Lange, P.A.

(57) ABSTRACT

A fuel injection system comprises a combustor liner, an air tube, a fuel manifold and a fuel injector. The combustor liner defines primary and secondary combustion zones. The air tube extends through the combustor liner along an axis to an exit aperture inside the combustor. The fuel manifold is positioned proximate the combustor line to deliver fuel through the air tube to the primary and secondary combustion zones. The fuel injector is coupled to the fuel manifold and positioned to inject the fuel along an axis of the air tube, such that the fuel has a substantially symmetric distribution at the exit aperture.

17 Claims, 4 Drawing Sheets

SYMMETRIC FUEL INJECTION FOR TURBINE COMBUSTOR

BACKGROUND

This invention relates generally to turbomachinery, and specifically to fuel injection for a turbine combustor. In particular, the invention concerns a fuel injection system for the combustor or burner section of a gas turbine engine, for example a propulsion turbine or turbojet engine.

Gas turbine engines (combustion turbines) are built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Small-scale engines including auxiliary power units typically utilize a one-spool design, with co-rotating compressor and turbine sections. Larger-scale jet engines and industrial gas turbines (IGTs) are generally arranged into a number of coaxially nested spools, which operate at different pressures and temperatures, and rotate at different speeds (or, depending on design, in different directions).

Individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Propulsion turbines for aviation include turbojet, turbofan, turboprop and turboshaft designs. In turbojet engines, thrust is generated primarily from the exhaust. Modern fixed-wing aircraft typically employ turbofan and turboprop configurations, in which the low pressure spool is coupled to a propulsion fan or propeller. Turboshaft engines are used on rotary-wing aircraft, including helicopters.

Commercial aircraft typically trend toward higher bypass turbofan designs, in order to reduce noise and increase efficiency. Jet fighters and other supersonic aircraft tend to use lower bypass turbofans, which provide more specific thrust but may also generate more noise and have lower efficiency at low speed.

Turbojet engines are considered an older design but advanced turbojet applications are also known, including continuously afterburning and hybrid ramjet configurations for ultra-high performance aircraft and aerospace vehicles. Turbojet engines are also used in smaller-scale flight vehicles, including unmanned/unpiloted aerial vehicles (UAVs) and expendable turbojet systems for guided munitions, missiles and decoys.

Across these applications, propulsion turbine performance depends on precise control of the combustion process. In particular, combustor design is driven by the desire for higher combustion temperatures, which tend to improve thrust performance, and the need for uniform fuel/air distribution in the combustion zone, in order to increase efficiency and reduce hotspots.

SUMMARY

This invention concerns a fuel injection system for the combustor of a turbomachine, and a turbojet engine utilizing the injection system. The system includes a combustor liner with primary and secondary combustion zones, a series of air tubes, a fuel manifold and a series of fuel injectors.

The air tubes extend through the combustor liner along a primary axis, with an exit aperture defined inside the combustor. The fuel manifold is arranged proximate the combustor liner, in order to deliver fuel via the fuel injectors through the air tubes to the primary and secondary combustion zones. The fuel injectors are coupled to the fuel manifold, and positioned to inject the fuel along the axes of the air tubes.

Each fuel injector generates a substantially symmetric fuel distribution at the exit aperture, with respect to the associated air tube axis. This configuration provides for more balanced fuel delivery to the primary and secondary combustion zones, across a range of different engine operating conditions and air/fuel momentum ratios.

DETAILED DESCRIPTION

Figure 1:
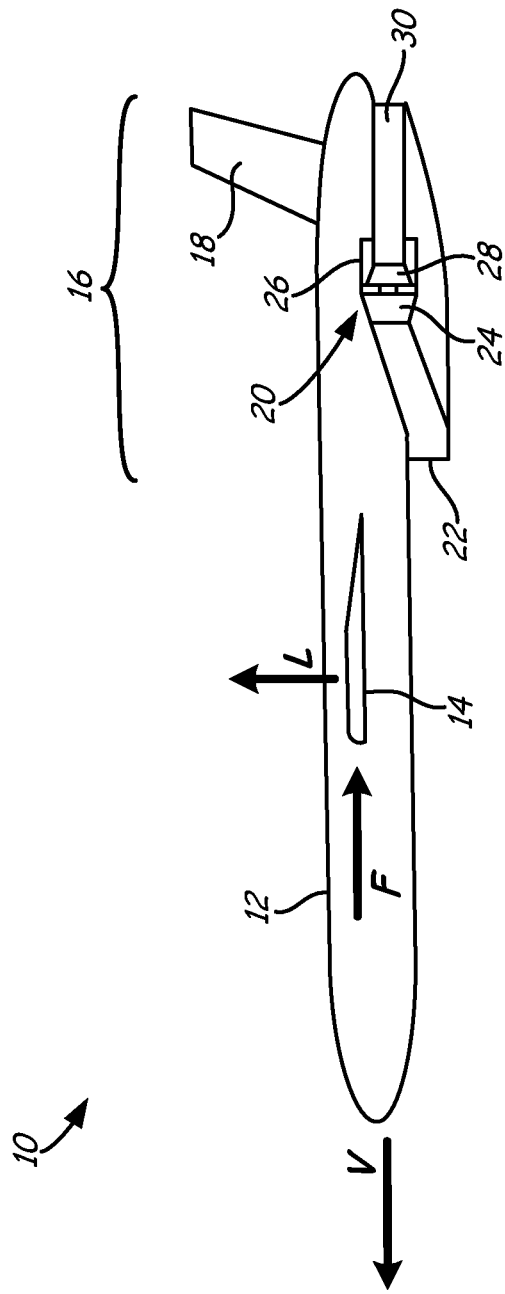
FIG. 1 is a schematic view of a flight vehicle powered by a gas turbine propulsion engine, with symmetric fuel injection.

FIG. 1 is a schematic view of flight vehicle 10. Flight vehicle 10 includes aerodynamic body 12, lift surfaces 14, aft section 16, stabilizer 18 and propulsion engine 20. Propulsion engine (or propulsion turbine) 20 is of a gas turbine or combustion turbine design, with inlet 22, compressor 24, combustor 26, turbine 28 and exhaust nozzle 30. Combustor 26 includes an axially-aligned fuel injector for improved performance and service life, as described below.

As shown in FIG. 1, flight vehicle 10 is configured for use as a guided munition or flight system, for example a guided missile or decoy. Alternatively, flight vehicle 10 is configured for use as an unmanned/unpiloted aerial vehicle (UAV) or drone, or a piloted aircraft. In these embodiments, the features of aerodynamic body (or fuselage) 12, lift surfaces (wings) 14, aft section (tail or empennage) 16 and stabilizer 18 vary accordingly.

In operation of flight vehicle 10, propulsion turbine 20 generates propulsive thrust to provide forward velocity V. Lift surfaces 14 support aerodynamic body 12 by generating lift L based on relative airflow F. Lift surfaces 14 and stabilizer 18 may also include flight surfaces to control the direction of forward airspeed V and maintain lift L, according to the thrust output from propulsion turbine 20.

The configuration of propulsion turbine 20 varies with application. In missile and decoy systems, for example, turbine engine 20 may be configured as a turbojet engine, for example in a one-spool single-use (expendable) or multiple-use (recoverable) design. In drone and UAV applications, turbine engine 20 may also be configured as a miniature turbofan. Alternatively, turbine engine 20 encompasses any of a turbojet, turbofan, turboprop, turboshaft or combustion turbine engine, in a range of single- and multi-spool configurations as described above, and as known in the art.

Figure 2:
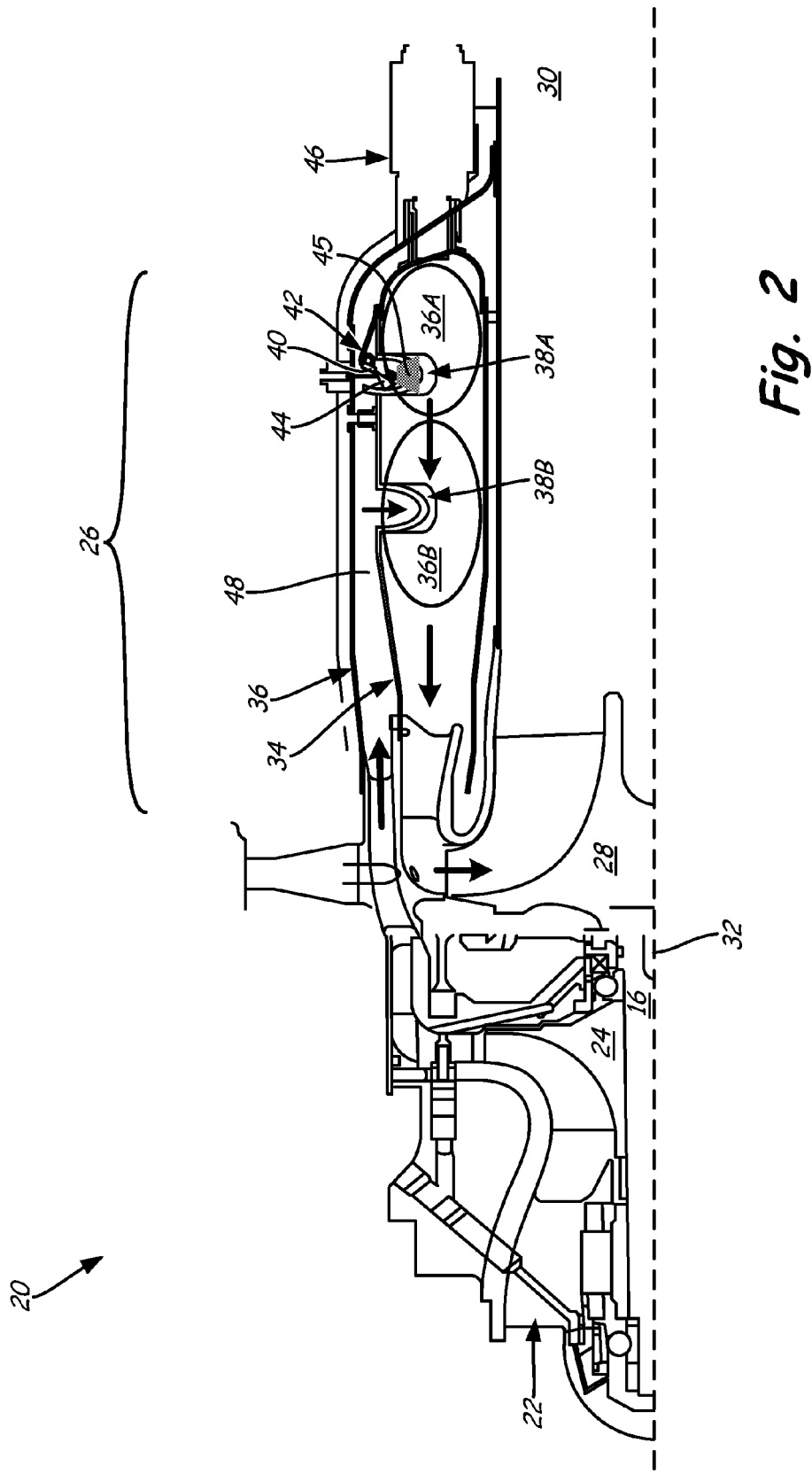
FIG. 2 is a side view of the propulsion engine, in a turbojet embodiment.

FIG. 2 is a schematic view of propulsion turbine 20, in a one-spool, radial-flow turbojet configuration for use on a UAV, drone, guided missile or decoy. In this particular example, propulsion turbine 20 comprises upstream inlet 22, radial compressor 24, combustor 26 and radial turbine 28, arranged in flow series with downstream exhaust nozzle 30. Turbine 28 is rotationally coupled to compressor 24 via shaft 32, which rotates about centerline (or turbine axis) $C_L$.

Combustor (or burner) 26 includes combustor liner 34, defining primary and secondary combustion zones 36A and 36B. Primary air tubes 38A provide air to primary combustion zone 36A and secondary combustion zone 36B. Secondary air tubes 38B may also be included to provide additional air to secondary combustion zone 36B.

Fuel injectors 40 introduce fuel from fuel manifold 42 into one or both of primary and secondary combustion zones 36A and 36B, for example via primary air tubes 38A. The fuel is mixed with air and ignited by ignition element 46, for example using a pyroflare or spark-type ignition device. In addition, cross-flow and swirl effects also mix fuel and air between primary and secondary combustion zones 36A and 36B.

In the particular configuration of FIG. 2, fuel injector elements 40 include a fuel delivery tube mounted to fuel manifold (or fuel rail) 42, discharging fan-spray fuel jet 44 onto the inner wall of primary air tube 38A. Each fuel injector 40 forms a wide-angle fuel film on the inner wall of air tube 38A, emerging as symmetrical fuel distribution 45 at the exit of air tube 38A to provide balanced fuel delivery to primary and secondary combustion zones 36A and 36B.

In operation of propulsion turbine 20, compressed air (compressor discharge) from compressor 24 enters combustor or burner section 26 in an axially downstream direction, passing through plenum region 48 between combustor liner 34 and turbine casing 36. Additional compressed air may also enter combustor 26 via a combination of cooling and dilution holes in combustor liner 34, as distributed along one or both of primary and secondary combustion zones 36A and 36B.

Downstream of combustor 26, combustion gas expands inside radial-flow turbine 28 to drive compressor 24 via shaft 32. Expanding combustion gas is directed aft from turbine 28 through exhaust nozzle 30, generating forward thrust for propulsion turbine 20.

Symmetric fuel distribution 45 provides improved fuel delivery across a range of different engine operating conditions and fuel flow rates. In particular, symmetric fuel injection provides a more balanced fuel delivery to primary and secondary combustion zones 36A and 36B, where the fuel balance is substantially independent of the air/fuel momentum ratio, as described below.

In the reverse-flow configuration of FIG. 2, primary airflow enters combustor 26 at the axially aft end of plenum 48, reversing inside combustor liner 34 so that combustion gases exit at the axially forward end of combustor 26. Thus, primary combustion zone 36A is located upstream and axially aft of secondary combustion zone 36B, and secondary combustion zone 36B is located downstream and axially forward of primary combustion zone 36A. Alternatively, an axial flow arrangement is utilized, and the relative combustion zone positions vary accordingly.

Figure 3:
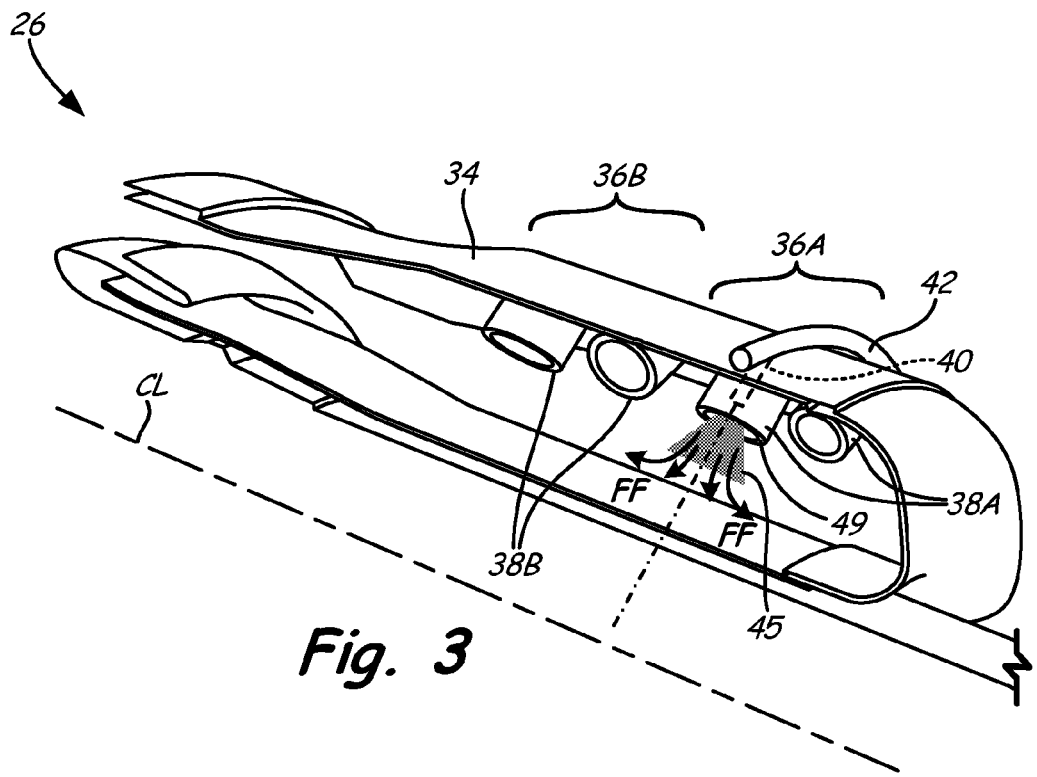
FIG. 3 is cutaway view of a combustor for the propulsion engine, showing the fuel injection system.

FIG. 3 is cutaway view of combustor 26, showing fuel injector 40 (dashed lines) with fuel delivery tube in fluid communication with fuel rail 42. Air tube 38A extends radially inward from combustor liner 34 along primary air tube axis A, defining exit aperture 49 inside combustor 26. Depending on configuration, air tube axis A may also have circumferential or axial components, as shown in FIG. 3, as well as a radial component.

Fuel injector 40 distributes fuel to primary and secondary combustions zones 36A and 36B in symmetric fuel distribution 45. Fuel distribution 45 is oriented along primary air tube axis A, and is uniform or symmetric about axis A at exit aperture 49, or planar symmetric with respect to a plane through axis A and perpendicular to centerline $C_L$. The symmetric fuel distribution is either axisymmetric around axis A of the air tube or symmetric with respect. to the plane which is formed by rotating axis A around centerline $C_L$. The planar symmetry plane is along axis A, with normal to the symmetry plane along centerline $C_L$ (i.e., perpendicular to the page through axis A in FIG. 4).

In the particular example of FIG. 3, fuel injectors 40 are provided in every other primary air tube 38A. In other configurations, fuel injectors 40 are provided in every primary air tube 38A, or in a different arrangement such as every third or fourth primary air tube 38A. Alternatively, fuel injectors 40 are provided in one or more secondary air tubes 38B, or in a combination of primary and secondary air tubes 38A and 38B.

Fuel injector 40 delivers balanced fuel distribution 45 to both primary combustion zone 36A and secondary combustion zone 36B (arrows). Cross-flow and swirl components within combustor 26 mix fuel from fuel distribution (or fuel spray) 45 in a generally axial and upstream sense within primary combustion zone 36A, and in a generally axial and downstream sense within secondary combustion zone 36B. This symmetric fuel injection configuration provides balanced fuel delivery with uniform fuel/air mixing for efficient operation of combustor section 26.

Symmetric fuel delivery contrasts with cross-flow fuel injectors and other asymmetric fuel injection designs, where the fuel distribution is asymmetric about axis A or with respect to the plane through axis A with normal direction pointing in the direction of $C_L$, the engine centerline. In asymmetric fuel injection configurations, the fuel balance at aperture 49 and consequnty between primary and secondary combustions zones 36A and 36B depends on the air-to-fuel momentum ratio; that is, the momentum ratio between the gas flow and the cross-flow fuel jets within air tubes 38A (or 38B). As a result, fuel feed into primary and secondary combustion zones 38A and 38B varies under different engine operating conditions, reducing combustion efficiency and contributing to hot spots, cold spots and burning instabilities. Combustors with asymmetric fuel delivery thus exhibit increased wear, and higher risk of premature combustor blow-out or other failure.

As shown in FIG. 3, symmetric fuel injection delivers a more uniform fuel distribution 45 at exit aperture 49 of air tube 38A, providing balanced fuel distribution (arrows) to primary and secondary combustion zones 36A and 36B, with reduced dependence on the air-fuel momentum ratio. In particular, fuel distribution 45 is symmetric (either rotationally or with respect to planar reflection) about axis A of air tube 38A, or the plane through axis A with normal direction pointing in the direction of centerline $C_L$, providing a balanced fuel distribution across a broader range of engine operating conditions, including start-up, idle, low power and high-demand conditions. Symmetric fuel distribution 45 also improves combustor performance and reduces burning instabilities, for increased service life and survivability, with fewer hot and cold spots and lower overall failure probability.

Figure 4:
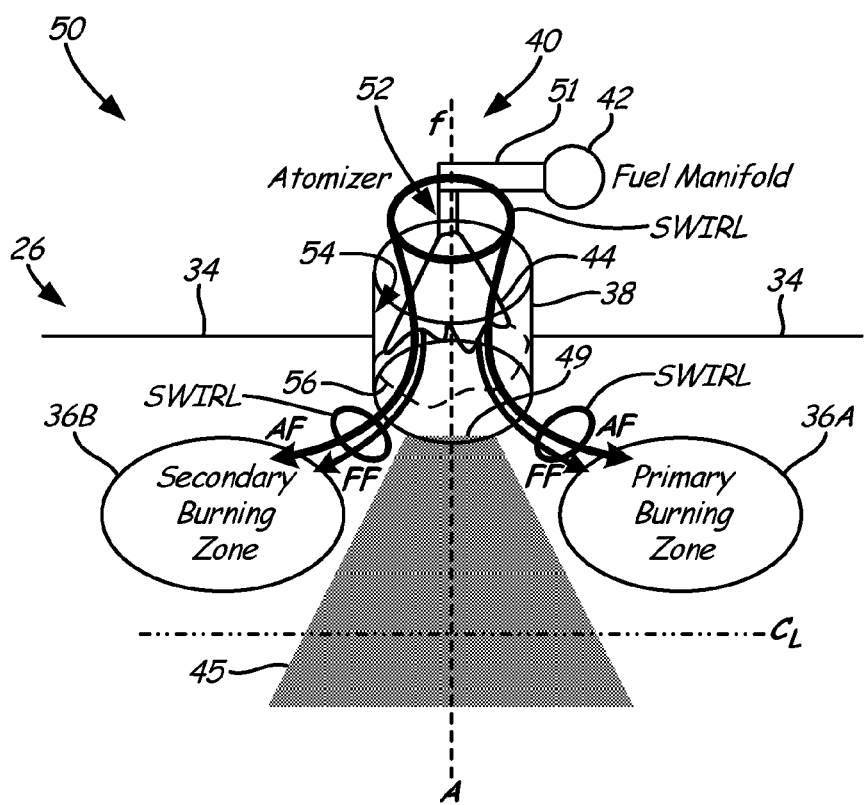
FIG. 4 is a schematic view of the fuel injection system, illustrating symmetric fuel distribution and balanced fuel delivery to the primary and secondary combustion zones.

FIG. 4 is a schematic view of fuel injection system 50 for combustor 26 of a gas turbine engine. Combustor 26 includes combustor liner 34, defining primary and secondary combustions zones 36A and 36B. Air tube 38 extends radially through combustor liner 34 along primary axis A to define exit aperture 49, inside combustor 26.

Fuel injection system 50 includes fuel injector 40 with fuel tube 51 and atomizer 52 coupled to fuel manifold 42. Atomizer 52 is positioned along primary axis A of air tube 38, and oriented to deliver fuel jet 44 along fuel delivery axis f. In this particular example, fuel delivery axis f coincides with primary axis A of air tube 38, so that fuel distribution 45 emerges from exit aperture 49 symmetrically about axis A of air tube 38 to provides balanced fuel delivery to primary and secondary combustion zones 36A and 36B under a range of different engine operating conditions and corresponding air and fuel flow momentum ratios.

As shown in FIG. 4, fuel tube 52 is in close proximity to either a primary or secondary air tube 38A or 38B (see, e.g., FIGS. 2 and 3), or another oxygen or oxidant source. In impinging configurations, fuel jet 44 impinges on inner surface 54 of air tube 38 to form wide-angle fuel film 56, which is distributed inside air tube 38 to form a uniform fuel distribution about primary axis A at exit aperture 49 independently of the air flow conditions within air tube 38. In non-impinging configurations, fuel jet 44 does not impinge on inner surface 54, but emerges from exit aperture 49 as an atomizer mist or other spray distribution 45.

In either design, fuel flow FF emerges from exit aperture 49 with a substantially symmetric distribution 45 about air tube axis A. As defined herein, substantially symmetric encompasses fuel distributions 45 that are substantially uniform with respect to rotation or reflection about axis A of air tube 38 at exit aperture 49, whether formed by direct atomization or impingement. Fuel distribution 45 may thus be rotationally or planar symmetric about axis A; that is, substantially uniform with respect to rotation about axis A of air tube 38, or reflection in the plane defined by the rotation of axis A around engine centerline $C_L$.

As defined herein, substantially uniform includes fuel distributions 45 that are substantially uniform with respect to the corresponding rotation or reflection about primary axis A of air tube 38 or the plane define by rotation of axis A around centerline $C_L$, within a nominal (mass flow) variation of less than about 30%. Alternatively, the nominal variation is less than 10%, or the nominal variation is less than 20% or 25%. Fuel distribution 45 has a range of corresponding substantially two-dimensional and substantially three-dimensional form, for example a conic section, conic surface or solid cone or wedge-shaped fuel spray.

Fuel jet 44 has a similar range of two- and three dimensional conic, conic section, and wedge or fan-shaped forms. Fuel jet 44 may also have a corresponding symmetry relation with respect to axis A, as shown in FIG. 4. That is, fuel jet 44 may be substantially uniform with respect to rotation about primary axis A of air tube 38 or reflection on the plane defined by rotation of axis A around centerline $C_L$, within a given nominal variation or tolerance in mass flow of 30%, 20% or 10%.

Alternatively, impinging fuel jet 44 may be asymmetric with respect to axis A. In these embodiments, swirl flow of the generated fuel film and/or asymmetric features on inside surface 54 of air tube 38 produce uniform fuel distribution 45 at exit aperture 49, independent of the air flow within air tube 38.

In each of these configurations, fuel flow FF emerges from exit aperture 49 in the form of symmetric fuel distribution 45, axially symmetric around axis A or planar symmetric with respect to the plane generated by axis A rotated around centerline $C_L$. This contrasts with substantially perpendicular or transverse fuel injection designs, where fuel is injected transversely to or across a free air stream AF, and the resulting fuel distribution depends strongly on the air/fuel momentum ratio due to strong air/fuel flow coupling.

In particular, fuel injection system 50 provides balanced fuel flow to primary and secondary combustion zones 36A and 36B across a broad range air/fuel momentum ratios or off-design engine operating conditions, including high fuel flow and low fuel flow conditions. Downstream from exit aperture 49 along air tube axis A, additional swirl and cross flow provide efficient fuel/air mixing in each of combustion zones 36A and 36B, for improved efficiency with reduced burning instabilities. Fuel injection system 50 also reduces hot and cold spots to increase service life and lower the risk chance of premature failure over the full range of engine conditions, including engine start, idle, low-power (low thrust) and high power (high-thrust) operations.

Fuel distribution 45 is symmetric under any air/fuel momentum ratio. Air swirl aids at certain conditions in order to generate symmetric fuel distribution 45 at aperture 49 of air tube 38, but this is only the case if the air swirl is significant compared to the axial velocity of the air flow through air tube 38. Here, the idea is to provide symmetric fuel jet 44 and subsequently symmetric fuel spray 45 at air tube aperture 49 under any air flow conditions.

This result can be obtained by 1) generation of axisymmetric fuel spray 45 (full cone or cone surface) independent of air swirl; or 2) generation of a fan sheet fuel spray 45 with symmetry plane formed by rotating axis A around $C_L$. In this case the fuel spray momentum has to be large enough so that the air momentum will not significantly impact the fuel trajectory. One way to generate such a symmetric fan spray 45 is by symmetric impact of fuel jet 44 onto inner surface 54 of air tube 38. Thin fuel film 56 will have very high momentum which despite the increased surface area will not significantly be impacted by the air flow momentum shearing on the film. In addition, 3) generation of fuel film 56 on inside surface 54 of air tube 38 with high fuel swirl is contemplated. This allows the entire (circumference of) air tube 38 to be covered by fuel film 56, and fuel film 56 on the air tube inner wall 54 will be uniform at aperture 49.

Figure 5A:
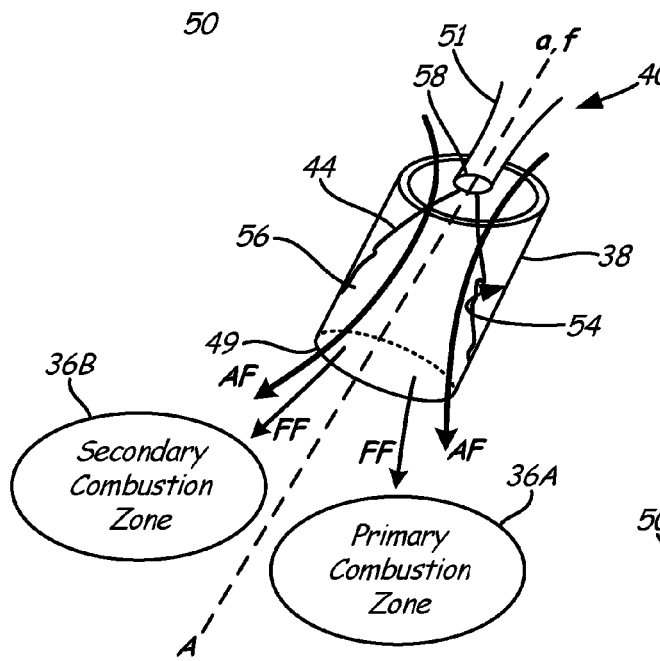
FIG. 5A is a schematic view of the fuel injection system, in an impingement atomizer configuration.

FIG. 5A is a schematic view of fuel injection system 50, in an impingement film configuration. In this configuration, fuel injector 40 comprises fuel tube 51 with an atomizer, nozzle, spray tip, fuel port or other delivery element 58 for injecting fuel jet 44 onto inner surface 54 of air tube 38.

As shown in FIG. 5A, fuel injector 40 is coaxially arranged within air tube 38, so that longitudinal axis a of fuel tube 51 coincides with fuel delivery axis f, each oriented along primary axis A of air tube 38. As used herein, along and substantially parallel to encompass relative angular differences within about 30 degrees)(≤30°, for example less than twenty degrees) (<20° or less than ten degrees)(<10°, as determined between any of fuel delivery axis f, primary air tube axis A and longitudinal axis a of fuel tube 51. Conversely, transverse and substantially perpendicular to encompass relative angular differences of about sixty degrees or more)(≥60°, for example greater than seventy degrees)(>70° or greater than eighty degrees)(>80°.

Fuel jet (or impingement jet) 44 is symmetric with respect to rotation or reflection about axis A, producing wide angle fuel film 56 on inner surface 54 of air tube 38. The combination of symmetric fuel jet 44 and swirling air flow AF distributes fuel film 56 uniformly about primary axis A of air tube 38, generating symmetric fuel distribution 45 at exit aperture 49 for balanced fuel delivery to primary and secondary combustion zones 36A and 36B.

Figure 5B:
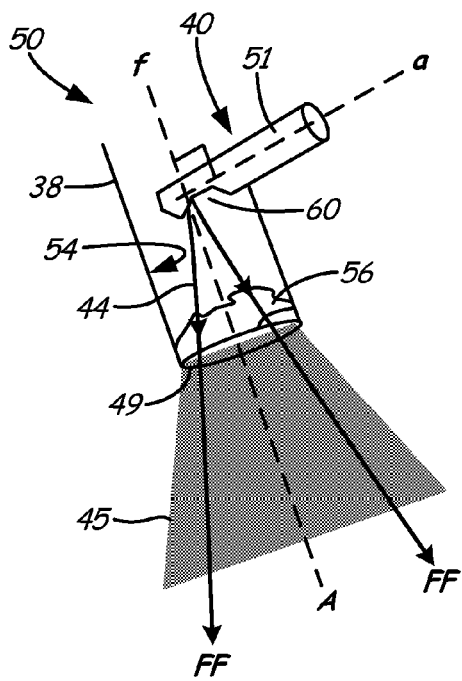
FIG. 5B is a perspective view of the fuel injection system, in a split-flow atomizer configuration.

FIG. 5B is a perspective view of fuel injection system 50, in a split-flow atomizer configuration. Split-flow atomizer 60 is formed as a slot, slit or other split-flow structure in fuel tube 51 along primary axis A of air tube 38, in order to deliver fuel jet 44 along fuel delivery axis f, with fuel delivery axis f oriented along or substantially parallel to air tube axis A.

As shown in FIG. 5B, fuel jet 44 has a substantially two-dimensional form (e.g., a conic section or two-dimensional conic surface fan spray), and fuel jet 44 is symmetric with respect to rotation or reflection about primary axis A of air tube 38. In contrast to FIG. 5A, however, longitudinal axis a of fuel tube 51 is transverse or substantially perpendicular with respect to primary air tube axis A. Fuel (or jet fuel) impinges on the end of fuel tube 51 and deflects into fan spray fuel jet 44 at atomizer 60. Fuel delivery axis f is determined by the orientation of atomizer 60, which is directed along or substantially parallel to axis A, and transverse or substantially perpendicular with respect to longitudinal axis a.

Figure 5C:
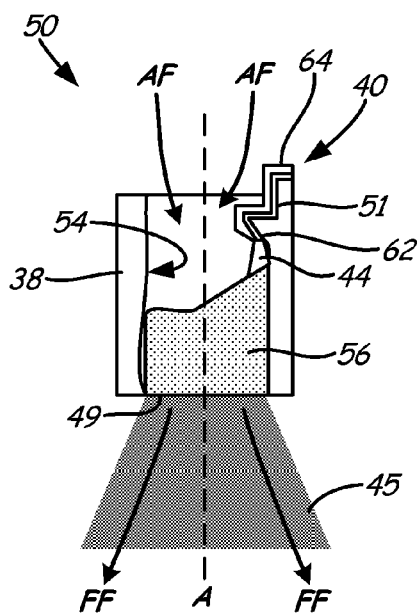
FIG. 5C is a schematic view of the fuel injection system, in an integrated air tube configuration.

FIG. 5C is a schematic view of fuel injection system 50, in an integrated air tube fuel delivery configuration. In this design, fuel tube 51 is formed along inner surface 54 of air tube 38, and fuel injector 40 includes an impingement atomizer, spray nozzle or similar impingement element 62 to generate fuel film 56 by impingement of fuel jet 44 onto inner surface 56 of air tube 38.

As shown in FIG. 5C, fuel tube 51 is not necessarily coaxial with air tube 38, and fuel jet 44 is not necessarily symmetric about primary axis A of air tube 38. Instead, air dam 64 can be used to encourage swirl and mixing of air flow AF within air tube 38, so that fuel film 56 is uniformly distributed about primary axis A of air tube 38 at exit aperture 49. As a result, fuel injection system 50 provides symmetric fuel distribution 45, as described above, for balanced fuel flow FF across a range of different fuel flow rates, air/fuel momentum ratios and engine operating conditions. In absence of the effect or air swirl, injection system 50 in FIG. 5C can still provide balanced fuel distribution 45 with planar symmetry with respect to the plane generated by rotation of axis A around centerline $C_L$.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. A fuel injection system comprising:
a combustor liner defining primary and secondary combustion zones;
an air tube extending through the combustor liner along an axis to an exit aperture inside the combustor, and comprising a fuel tube formed along an inner axial surface of the air tube which forms a boundary for air flow, the fuel tube offset from the axis of the air tube;
a fuel manifold positioned proximate the combustor liner to deliver fuel through the air tube to the primary and secondary combustion zones; and
a fuel injector coupled to the fuel manifold and positioned to inject the fuel from the fuel tube substantially in a direction parallel to the axis of the air tube, such that the fuel has a substantially symmetric distribution about the axis of the air tube, at the exit aperture.

2. The system of claim 1, wherein the fuel injector comprises an impingement nozzle for injecting the fuel onto an inner surface of the air tube.

3. The system of claim 2, wherein the fuel injector generates a fuel film on the inner surface of the air tube, the fuel film being substantially uniform at the exit aperture with respect to rotation about the axis of the air tube.

4. The system of claim 1, wherein the fuel distribution at the exit aperture is substantially rotationally uniform about the axis of the air tube.

5. The system of claim 4, wherein the fuel distribution at the exit aperture is substantially rotationally uniform about the axis of the air tube, within a nominal variation of twenty-five percent.

6. A turbojet engine comprising the fuel injection system of claim 1.

7. An unmanned flight vehicle comprising the turbojet engine of claim 6.

8. A combustor for a gas turbine engine, the combustor comprising:
a combustor liner defining primary and secondary combustion zones;
an air tube extending through the combustor liner to an exit aperture, the air tube defining an air tube axis for delivery of fuel and air to the primary and secondary combustion zones, and comprising a fuel tube formed along an inner axial surface of the air tube which forms a boundary for air flow, the fuel tube offset from the axis of the air tube;
a fuel manifold positioned proximate the combustor liner to deliver fuel through the air tube into the primary and secondary combustion zones; and
a fuel injector coupled to the fuel manifold and receiving fuel from the fuel tube and positioned within the air tube to generate a substantially symmetric fuel distribution with respect to the air tube axis at the exit aperture.

9. The combustor of claim 8, wherein the fuel injector comprises an impingement nozzle positioned to form a fuel film on an inside surface of the air tube, the fuel film being substantially uniform about the air tube axis at the exit aperture.

10. The combustor of claim 8, wherein the fuel injector comprises an impingement nozzle positioned to inject the fuel onto an inner surface of the air tube.

11. The combustor of claim 10, wherein the air tube provides swirl flow to distribute the fuel on the inner surface of the air tube into a substantially uniform fuel film at the exit aperture.

12. An expendable turbojet engine comprising the combustor of claim 8.

13. A turbojet engine comprising:
a compressor and a turbine in flow series; and
a combustor positioned between the compressor and the turbine in the flow series, the combustor comprising:
a liner defining primary and secondary combustion zones;
an air tube extending radially through the combustor liner to an exit aperture;
a fuel manifold for delivering fuel to the primary and secondary combustion zones along an axis of the air tube; and
a fuel injector positioned to inject the fuel substantially in a direction parallel to the axis of the air tube and comprising a fuel tube formed along an inner axial surface of the air tube which forms a boundary for air flow, the fuel tube offset from the axis of the air tube, such that the fuel injector generates a substantially symmetric fuel distribution at the exit aperture of the air tube.

14. The turbojet engine of claim 13, wherein the fuel injector comprises an impingement nozzle for forming the fuel distribution as a fuel film on the inner surface of the air tube.

15. The turbojet engine of claim 14, wherein the fuel film is substantially uniform with respect to rotation about the axis of the air tube at the exit aperture.

16. The turbojet engine of claim 14, wherein the impingement nozzle is positioned off the axis of the air tube, proximate the inner surface.

17. An expendable flight vehicle comprising the turbojet engine of claim 13.

* * * * *